United States Patent [19]

Kubo et al.

[11] Patent Number: 5,614,123
[45] Date of Patent: Mar. 25, 1997

[54] AGENT FOR TREATING TEXTILE

[75] Inventors: Motonobu Kubo; Takashi Enomoto; Taro Sano; Kazunori Hayashi; Akihiko Ueda; Masamichi Morita, all of Settsu, Japan

[73] Assignee: Daikin Industries Ltd., Osaka, Japan

[21] Appl. No.: 500,925

[22] PCT Filed: Jan. 28, 1994

[86] PCT No.: PCT/JP94/00117

§ 371 Date: Jul. 31, 1995

§ 102(e) Date: Jul. 31, 1995

[87] PCT Pub. No.: WO94/18377

PCT Pub. Date: Aug. 18, 1994

[30] Foreign Application Priority Data

Feb. 1, 1993 [JP] Japan ..................... 5-014620

[51] Int. Cl.$^6$ ................. D06M 15/256
[52] U.S. Cl. ............. 252/8.62; 252/8.61; 106/2; 526/242; 526/243; 526/244; 526/248
[58] Field of Search ............. 252/8.6, 8.7, 8.9, 252/8.62, 8.61; 106/2; 526/242, 243, 244, 248

[56] References Cited

U.S. PATENT DOCUMENTS

| | | | |
|---|---|---|---|
| 3,645,990 | 2/1972 | Reynolds | 526/245 |
| 4,264,484 | 4/1981 | Patel | 427/372.2 |
| 4,296,224 | 10/1981 | Fukui et al. | 526/243 |
| 4,340,749 | 7/1982 | Patel | 560/182 |
| 4,468,527 | 8/1984 | Patel | 564/96 |

FOREIGN PATENT DOCUMENTS

| | | |
|---|---|---|
| 46-642 | 8/1971 | Japan . |
| 47-7600 | 4/1972 | Japan . |
| 52-35188 | 3/1977 | Japan . |
| 55-9619 | 1/1980 | Japan . |
| 55-29501 | 3/1980 | Japan . |
| 55-128075 | 10/1980 | Japan . |
| 60-8068 | 2/1985 | Japan . |
| 61-50082 | 11/1986 | Japan . |
| 3-153716 | 7/1987 | Japan . |
| 63-21715 | 5/1988 | Japan . |
| 63-43509 | 8/1988 | Japan . |
| 63-56912 | 11/1988 | Japan . |
| 63-67511 | 12/1988 | Japan . |
| 1372037 | 10/1974 | United Kingdom . |

*Primary Examiner*—Anthony Green
*Attorney, Agent, or Firm*—Birch, Stewart, Kolasch & Birch, LLP

[57] ABSTRACT

A textile treatment agent which contains, as an active component, a graft fluorocopolymer having a backbone of a polymer of a fluoromonomer and a branch of a polymer of a fluorine-free macromonomer prepared by copolymerizing the fluoromonomer with the macromonomer which is a fluorine-free macromonomer having addition-polymerizable unsaturated group at a molecular end gives excellent water- and oil-repellency and stainproof property.

13 Claims, No Drawings

AGENT FOR TREATING TEXTILE

FIELD OF THE INVENTION

The present invention relates to an agent for treating a textile, particularly relates to a textile treatment agent comprising a fluorine-containing graft polymer.

RELATED ART

Hitherto, known is a water- and oil-repellent comprising a random copolymer of a polyfluoroalkyl group-containing monomer and another copolymerizable hydrocarbon monomer. For example, a copolymer of the polyfluoroalkyl group-containing monomer and a long chain alkyl group-containing (meth)acrylate such as stearyl (meth)acrylate can have better water- and oil-repellency and better resistance to the washing and dry cleaning than a homopolymer of the polyfluoroalkyl group-containing monomer (cf. Japanese Patent Kokai Publication Nos. 9619/1980 and 29501/1980 and Japanese Patent Kokoku Publication Nos. 8068/1985 and 56912/1988).

Recently filed was a patent application disclosing that a graft copolymer in which a branch segment made of a fluoropolymer is grafted to a backbone segment made of a hydrocarbon polymer can cover more effectively a treated substrate such as a fiber than the above random copolymer and can give the high water- and oil-repellency even in a small amount (cf. Japanese Patent Kokoku Publication Nos. 50082/1986, 21715/1988, 43509/1988 and 67511/1988).

On the other hand, hitherto, a random copolymer of a polyfluoroalkyl group-containing monomer and a copolymerizable specific monomer is well-known as the agent for giving the stainproof property to a textile typically such as a carpet. For example, Japanese Patent Kokai Publication Nos. 642/1971 and 35188/1977 can be referred to.

It is reported that a mixture of a polyfluoroalkyl group-containing compound and a water-insoluble addition-polymerization polymer having a specific transition temperature can be used for the stainproof treatment of carpet. Japanese Patent Kokai Publication Nos. 7600/1972 and 128075/1980 can be referred to.

However, the above conventional random copolymer, graft copolymer and mixture still have insufficient water- and oil-repellency and stainproof property, and the treated fiber lacks in softness. When these copolymers prepared by the solution polymerization are used at a low temperature, the solubility is insufficient so as to give problems such as solidification in solution. Accordingly, there is a problem that the composition of the used copolymer and the kind of solvent are limited.

Generally, in the case of the random copolymer, the fluorine-containing component and the hydrocarbon component are present in the unit of monomer so that the functions thereof are canceled out. In the case of the graft copolymer, a microscopic phase separation structure is formed and the functions of both of the fluorine-containing component and the hydrocarbon component can be theoretically exhibited. However, the above Patent Publications suffer from the disadvantages that the graft copolymer has the insufficient graft efficiency and a homopolymer is present, or the number and length of the branches are ununiform, and that the functions of the graft copolymer are not sufficiently exhibited.

SUMMARY OF THE INVENTION

An object of the present invention is to provide a textile treatment agent having the excellent water- and oil-repellency and stainproof property.

The present inventors intensively studied to solve the above problems. Finally, the present inventors found that the object is achieved by the use of a graft fluorocopolymer having a backbone of a polymer of a fluoromonomer and a branch of a polymer of a macromonomer, the graft fluorocopolymer being prepared by copolymerizing the fluoromonomer with the macromonomer which is a fluorine-free macromonomer having addition-polymerizable unsaturated group at a molecular end, and completed the present invention.

Accordingly, the gist of the present invention resides in a textile treatment agent which comprises the graft fluorocopolymer prepared by the above method as an active component.

The textile treatment agent of the present invention can act as a water-and oil-repellent and a stainproofing agent.

DETAILED DESCRIPTION OF THE INVENTION

The graft fluorocopolymer according to the present invention has an average molecular weight of usually from 5,000 to 1,000,000, preferably from 10,000 to 20,000.

Specific examples of the fluoromonomer used for the preparation of the graft fluorocopolymer are the following monomers, a typical example of which is a (meth)acrylate containing a polyfluoroalkyl group:

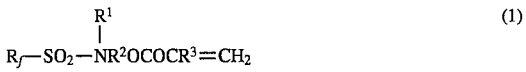

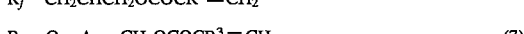

wherein $R_f$ is a polyfluoroalkyl group or polyfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may have a substituent group, and n is an integer of 1 to 10.

Specific examples of the fluoromonomer are as follows:

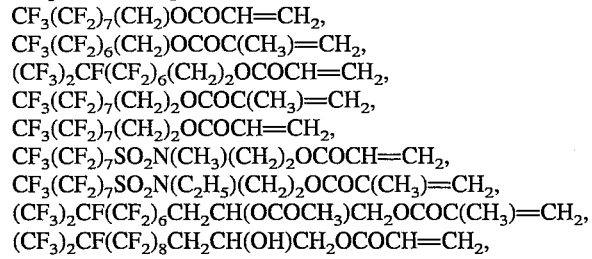

$CF_3C_6F_{10}(CF_2)_2SO_2N(CH_3)(CH_2)_2OCOCCH=CH_2$,

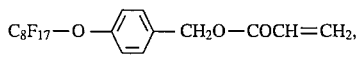

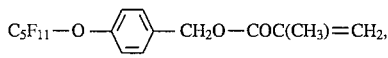

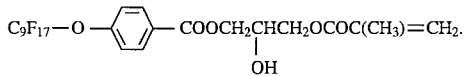

The macromonomer which is copolymerized with the fluoromonomer is of the formula:

$$Z-D\!-\!(CH_2-\underset{\underset{A}{|}}{\overset{\overset{X}{|}}{C}})_{\overline{n}}H. \qquad (I)$$

In the formula (I), X is a hydrogen atom or methyl group, A is COOR (wherein R is linear or branched alkyl group having 1 to 22 carbon atoms), CN or a phenyl group, n is from 10 to 500, Z is a (meth)acryloyl group, a styryl group, an allyl group, or a vinyl ester group, and D is $$-S-CH_2COOCH_2CHCH_2OCO- \\ | \\ OH$$

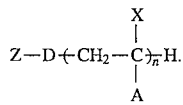

$-S-CH_2CH_2OCO-$, or $-CH_2CH_2OCO-$.

Specific non-limiting examples of the macromonomer are a macromonomer having a (meth)acrylate repeating unit such as

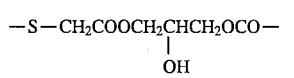

wherein m is 10 to 500 and n is 1 to 22, for example,

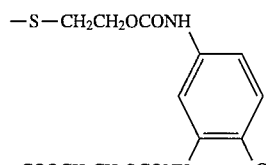

wherein m is 10 to 500,

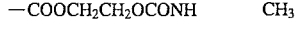

wherein m is 10 to 500,

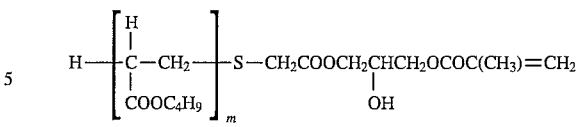

wherein m is 10 to 500; or

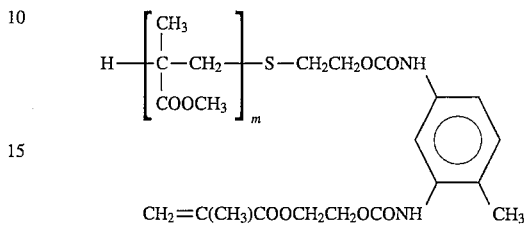

wherein m is 10 to 500,

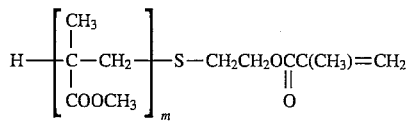

wherein m is 10 to 500, a macromonomer having a styrene repeating unit such as

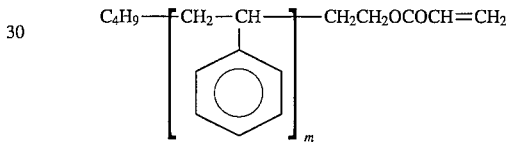

wherein m is 10 to 500,

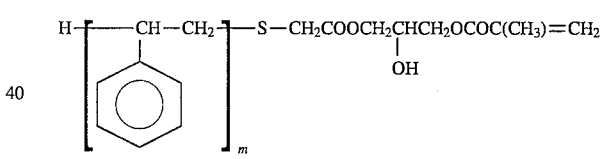

wherein m is 10 to 500.

When the textile treatment agent is used for the carpet, the use of fluorine-free macromonomer having a glass transition temperature or melting point of at least 35° C. gives the improved dry-soil stainproof property.

Typical methods for preparing the macromonomer having the alkyl (meth)acrylate repeating unit are a method comprising radically polymerizing alkyl (meth)acrylate in the presence of a mercaptan chain transfer agent having a carboxyl group to give a polymer having the carboxyl group at one molecular end and then reacting the polymer with (meth)acrylate having an epoxy group; or a method comprising radically polymerizing alkyl (meth)acrylate in the presence of a mercaptan chain transfer agent having a hydroxyl group such as 2-mercaptoethanol to give a polymer having the hydroxyl group at one molecular end and then reacting the polymer with (meth)acrylic acid halide or then conducting the reaction with a diisocyanate and conducting the reaction with 2-hydroxyethyl methacrylate. The fluorine-free alkyl (meth)acrylate macromonomer used in the present invention may be commercially available one, for example, a macromonomer manufactured by Toagosei Chemical Industry Ltd., Co. such as a macromonomer having a methyl methacrylate repeating unit, AA-6 (number average molecular weight Mn: 6,000) and AA-2 (Mn: 2,000), a macromonomer having a butyl acrylate repeating unit, AB-6 (Mn: 6,000) and a macromonomer having stearyl methacrylate repeating unit, MM8-SMA (Mn: 9,000).

In order to give the fiber the softness, an alcohol moiety of the above alkyl (meth)acrylate polymeric portion preferably has 12 to 22 carbon atoms.

The number of the repeating units in the polymeric portion of the macromonomer is preferably from 10 to 500.

The graft copolymer used in the present invention contains at least 30% by weight of the fluoromonomer as a constituent unit. If the amount is smaller than 30% by weight, the excellent water- and oil-repellency and stainproof property cannot be obtained. The amount of the used fluorine-free macromonomer is from 1 to 70% by weight. If the amount is smaller than 1% by weight, the water- and oil-repellency, the stainproof property and the softness cannot be improved. If the amount is larger than 70% by weight, the decreases of the water-repellency, the stainproof property and the softness are not observed but the oil-repellency disadvantageously decreases.

In the present invention, another fluorine-free copolymerizable monomer can be added in the amount of not larger than 69% by weight of the copolymer in addition to the above monomers. Specific examples of the another fluorine-free monomer are ethylene, vinyl acetate, vinyl chloride, vinylidene halide, (meth)acrylic acid, (meth)acrylonitrile, styrene, α-methylstyrene, (meth)acrylamide, N-methylol-(meth)acrylamide, alkyl (meth)acrylate, hydroxymethyl (meth)acrylate, hydroxyethyl (meth)acrylate, hydroxypropyl (meth)acrylate, 3-chloro-2-hydroxypropyl (meth)acrylate, polyethyleneglycol (meth)acrylate, polypropyleneglycol (meth)acrylate, methoxypolyethyleneglycol (meth)acrylate, methoxypolypropyleneglycol (meth)acrylate, N,N-dimethylaminoethyl (meth)acrylate, N,N-diethylaminoethyl (meth)acrylate, vinyl alkyl ether, butadiene, isoprene, chloroprene, glycidyl (meth)acrylate, tetrahydrofurfuryl (meth)acrylate, maleic anhydride, benzyl (meth)acrylate, phenoxyethyl (meth)acrylate, dicyclopentenyl (meth)acrylate, methacrylic acid hydroxypropyltrimethylammonium chloride, methacrylic acid ethyltrimethylammonium chloride and the like. The copolymerization with these monomers optionally improves various properties such as the water- and oil-repellency, the stainproof property such as the dry soil stainproof property, the dye attachment prohibition and the soil releasability, the anti-static property, the antibacterial property, the friction resistance, the cleaning resistance, the feeling, and the dispersion stability in a medium such as water.

The graft copolymer of the present invention can be prepared by any usual polymerization method, such as a solution polymerization, a suspension polymerization, an emulsion polymerization and a bulk polymerization.

For example, in the solution polymerization, the fluoromonomer and the fluorine-free macromonomer are dissolved in an organic solvent in the presence of a polymerization initiator, the atmosphere is replaced with the nitrogen, and the mixture is heated at 50°–120° C. for several hours with stirring. Specific examples of the polymerization initiator are azobisisobutyronitrile, benzoyl peroxide, di-tert-butyl peroxide, lauryl peroxide, cumene hydroperoxide, tert-butyl peroxypivalate, diisopropyl peroxydicarbonate and the like. The amount of the polymerization initiator is preferably from 0.01 to 5 parts by weight per 100 parts by weight of the monomer.

The organic solvent is inactive to and dissolves the fluoromonomer and the fluorine-free macromonomer. Specific examples of the organic solvent are pentane, hexane, heptane, octane, cyclohexane, benzene, toluene, xylene, petroleum ether, tetrahydrofuran, 1,4- dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane and the like. The amount of the organic solvent is preferably from 50 to 1,000 parts by weight per 100 parts by weight of the monomer.

For example, in the emulsion polymerization, the fluoromonomer and the fluorine-free macromonomer are emulsified in water, the atmosphere is replaced with the nitrogen, and the mixture is heated at 50° to 80° C. for several hours with stirring to conduct the copolymerization. Specific examples of a polymerization initiator are benzoyl peroxide, lauroyl peroxide, tert-butyl perbenzoate, 1-hydroxycyclohexylhydroperoxide, 3-carboxypropionyl peroxide, acetyl peroxide, azobisisobutylamidine-dihydrochloride salt, azobisisobutyronitrile, sodium peroxide, potassium persulfate, ammonium persulfate, di-tert-butyl peroxide, lauryl peroxide, cumene hydroperoxide, tert-butyl peroxypivalate, diisopropyl peroxydicarbonate and the like. The amount of the polymerization initiator is preferably from 0.01 to 5 parts by weight per 100 parts by weight of the monomer.

In order to give the aqueous dispersion of the graft copolymer having the high graft efficiency and the excellent shelf stability, it is preferable to use an emulsifying apparatus giving a high shear energy such as a high pressure homogenizer and an ultrasonic homogenizer so as to finely disperse the monomer in water and it is preferable to use an oil-soluble polymerization initiator. An emulsifier may be various one such as cationic, anionic and nonionic one. The amount of the emulsifier is from 0.5 to 10 parts by weight per 100 parts by weight of the monomer.

When the fluoromonomer is not completely compatible with the fluorine-free macromonomer, it is possible to add a water-soluble organic solvent or low-molecular-weight monomer which is compatible with both monomers so as to improve the compatibility between the fluoromonomer and the fluorine-free macromonomer so that the emulsification property and the copolymerization property are improved. Specific examples of the water-soluble organic solvent used for this purpose are acetone, methyl ethyl ketone, ethyl acetate, dipropyleneglycol monomethyl ether, propylene glycol, dipropylene glycol, tripropylene glycol, ethanol and the like. The amount of the water-soluble organic solvent is preferably from 10 to 40 parts by weight per 100 parts by weight of water. Specific examples of the low-molecular-weight monomer are methyl methacrylate, glycidyl methacrylate, 2,2,2-trifluoroethyl methacrylate and the like. The amount of the low-molecular-weight monomer is preferably from 5 to 95 parts by weight per 100 parts by weight of the total amount of the fluoromonomer and the fluorine-free macromonomer.

A material treated with the textile treatment agent of the present invention is not limited. Specific examples of the treated material are a natural fiber such as cotton, hemp, wool and silk; a semisynthetic fiber such as rayon and acetate; a synthetic fiber such as a polyamide, a polyester, acryl, polypropylene, polyvinyl chloride and polyvinyl alcohol. The treated material is the textile which may be in any form of a fiber, a yarn, a fabric (for example, woven fabric and knitted fabric) and the like.

The textile treatment agent of the present invention can be applied by a conventional procedure. For example, a solution or dispersion of the textile treatment agent in an organic solvent or water is adhered to the treated material by a dip coating, a spray coating or a bubble coating and then the treated material is dried. If necessary, a suitable crosslinking agent is used together with the textile treatment agent to conduct the curing.

In the treatment liquid, for example, in the case of the dip coating, the concentration of the graft fluorocopolymer is from 0.1 to 10% by weight.

In addition to the textile treatment agent of the present invention, another stainproof agent, water-repellent or oil-repellent, an antibacterial agent, an antistatic agent, a flame retardant, an insecticide, an feeling controlling agent, a dye fixing agent and the like may be added.

PREFERRED EMBODIMENT OF THE INVENTION

The present invention will be illustrated by the following Preparative Examples and Examples which do not limit the present invention.

Preparative Example 1 (Preparation by solution polymerization of graft copolymer having the branch component of polymethyl methacrylate)

In a 200 ml four-necked flask equipped with a reflux condenser, a nitrogen introducing tube, a thermometer and a stirrer, 10 g of a polymethyl methacrylate/methacryloyl group type macromonomer (AA-6 manufactured by Toagosei Chemical Industry Co. Ltd., number average molecular weight: 6,000, a macromonomer wherein a repeating unit is methyl methacrylate and a polymerizable end is a methacryloyl group, hereinafter referred to as "MMA-MM") and 10 g of $CF_3CF_2(CF_2CF_2)_n(CH_2)_2OCOCH=CH_2$ (a mixture of compounds in which n is 3, 4 and 5 in a molar ratio of 6:3:1, hereinafter referred to as "FA") and 180 g of 1,1,1-trichloroethane were charged and heated to 60° C. Then, the atmosphere in the flask was replaced with a nitrogen gas for 30 minutes. One gram of tert-butyl peroxypivalate (trade name: Perbutyl PV, manufactured by Nippon Oil & Fat Co. Ltd.) was added and the polymerization was conducted for 6 hours. The gas chromatography analysis revealed that at least 99% of the monomer was consumed. Disappearance of the elution peak of the macromonomer in GPC confirmed the complete polymerization of the macromonomer.

Preparative Example 2 (Preparation by solution polymerization of graft copolymer having branch component of polystearyl methacrylate)

In a 200 ml four-necked flask, 10 g of a polystearyl methacrylate/methacryloyl group type macromonomer (MM8-SMA, manufactured by Toagosei Chemical Industry Co. Ltd.; number average molecular weight: 9,000; used after removing toluene from the commercially available 50 wt % solution in toluene; a macromonomer in which the repeating unit is stearyl methacrylate and the polymerizable molecular end is a methacryloyl group; hereinafter referred to as "SMA-MM"), 10 g of FA and 180 g of 1,1,1-trichloroethane were charged and heated to 60° C. Then, the atmosphere in the flask was replaced with a nitrogen gas for 30 minutes. One gram of Perbutyl PV was added and the polymerization was conducted for 6 hours. The gas chromatography analysis revealed that at least 99% of the monomer was consumed. Disappearance of the elution peak of the macromonomer in GPC confirmed the complete polymerization of the macromonomer.

Preparative Example 3 (Preparation by emulsion polymerization of graft copolymer having branch component of polymethyl methacrylate)

A mixture consisting of 50 g of MMA-MM, 50 g of FA, 135 g of deionized water, 40 g of acetone, 0.1 g of n-lauryl mercaptan, 1 g of stearyltrimethylammonium chloride and 2 g of polyoxyethyleneoctylphenylether was heated to 60° C. and emulsified by the use of a high pressure homogenizer. The resultant emulsion was charged in a 300 ml four-necked flask equipped with a reflux condenser, a nitrogen introducing tube, a thermometer and a stirrer and kept at 60° C. in the nitrogen atmosphere for one hour with intimately stirring. Then, a solution of 1 g of azobisisobutyronitrile (AIBN) in 5 g of acetone was added to initiate the polymerization and the mixture was heated at 60° C. for 3 hours with stirring. The gas chromatography analysis revealed that at least 99% of the monomer was consumed to prepare the resultant graft copolymer. Disappearance of the elution peak of the macromonomer in GPC confirmed the complete polymerization of the macromonomer.

Preparative Example 4 (Preparation by emulsion polymerization of graft copolymer having branch component of polystearyl methacrylate)

A mixture consisting of 50 g of SMA-MM, 50 g of FA, 135 g of deionized water, 40 g of acetone, 0.1 g of n-lauryl mercaptan, 1 g of stearyltrimethylammonium chloride and 2 g of polyoxyethyleneoctylphenylether was heated to 60° C. and emulsified by the use of a high pressure homogenizer. The resultant emulsion was charged in a 300 ml four-necked flask equipped with a reflux condenser, a nitrogen introducing tube, a thermometer, a stirrer and kept at 60° C. in the nitrogen atmosphere for one hour with intimately stirring. Then, a solution of 1 g of azobisisobutyronitrile (AIBN) in 5 g of acetone was added to initiate the polymerization and the mixture was heated at 60° C. for 3 hours with stirring. The gas chromatography analysis revealed that at least 99% of the monomer was consumed. Disappearance of the elution peak of the macromonomer in GPC confirmed the complete polymerization of the macromonomer.

Comparative Preparative Example 1 (Preparation by solution polymerization of random copolymer)

In a 200 ml four-necked flask, 10 g of stearyl methacrylate (SMA), 10 g of FA and 180 g of 1,1,1-trichloroethane were charged. The mixture was heated at 60° C., and the atmosphere in the flask was replaced with the nitrogen gas for 30 minutes. One gram of Perbutyl PV was added to initiate the polymerization and the polymerization was conducted for 6 hours. The gas chromatography analysis revealed that at least 99% of the monomer was consumed.

Comparative Preparative Example 2 (Preparation by solution polymerization of graft copolymer having the branch component of polyfluoroacrylate)

A copolymer was prepared according to the method for preparing a graft copolymer described in Japanese Patent Kokai Publication No. 73712/1986. 10 g of SMA and 180 g of toluene were charged in a 200 ml four-necked flask and heated at 80° C. The atmosphere in the flask was replaced with the nitrogen gas for 30 minutes. Benzoyl peroxide (BPO) was added and the polymerization was conducted for 6 hours. The gas chromatography analysis revealed that at least 99% of the monomer was consumed in the resultant polymer. 10 g of FA and 0.1 g of BPO were added to the toluene solution containing the polymer and the mixture was heated to 80° C. The graft polymerization was conducted under the nitrogen atmosphere for 6 hours with stirring. The gas chromatography analysis revealed that at least 99% of the monomer was consumed to prepare the resultant graft copolymer. Since the undissolved part of the resultant graft copolymer in fluorinated hydrocarbon R-113 was 5 g, the graft efficiency was assumed to be 50%.

Comparative Preparative Example 3 (Preparation by solution polymerization of random copolymer)

The same procedure as in Preparative Example 1 was repeated to prepare a random copolymer, except that methyl methacrylate was used instead of MMA-MM.

Preparative Example 5 (Preparation by emulsion polymerization of graft copolymer having branch component of polymethyl methacrylate)

A mixture consisting of 50 g of FA, 10 g of MMA-MM, 40 g of methyl methacrylate, 300 g of deionized water, 5 g of polyoxyethyleneoctylphenylether, 5 g of stearyltrimethylammonium chloride and 0.1 g of n-lauryl mercaptan was heated to 60° C. and emulsified by the use of a high pressure homogenizer. The resultant emulsion was charged in a 500 ml four-necked flask equipped with a reflux condenser, a nitrogen introducing tube, a thermometer and a stirrer and the atmosphere was replaced with the nitrogen gas for 30 minutes. Then, a solution of 0.5 g of azobisisobutyronitrile in 5 g of ethyl acetate was added and the polymerization was conducted at 60° C. for 3 hours. The gas chromatography analysis and GPC analysis revealed that at least 99% of the monomer was consumed and the graft copolymer was obtained.

Preparative Example 6 (Preparation by emulsion polymerization of graft copolymer having branch component of polystyrene)

The same procedure as in Preparative Example 5 was repeated to prepare the graft copolymer, except that a polystyrene/methacryloyl group type macromonomer (AS-6, manufactured by Toagosei Chemical industry Co. Ltd.; number average molecular weight: 6,000; a macromonomer in which the repeating unit is styrene and the polymerizable end is a methacryloyl group; hereinafter referred to as "St-MM") and styrene were used instead of MMA-MM and methyl methacrylate, respectively.

Preparative Example 7 (Preparation by emulsion polymerization of graft copolymer having branch component of polymethyl methacrylate)

The same polymerization as in Preparative Example 5 was repeated to prepare the graft copolymer, except that 50 g of FA, 25 g of MMA-MM, 25 g of methyl methacrylate, 250 g of deionized water, 50 g of ethyl acetate, 5 g of polyoxyethyleneoctylphenylether, 5 g of stearyltrimethylammonium chloride and 0.1 g of n-lauryl mercaptan were used as the raw materials.

Comparative Preparative Example 4 (Preparation by emulsion polymerization of random copolymer)

The same polymerization was conducted as in Preparative Example 5 to prepare the random copolymer, except that MMA-MM was not used and the amount of methyl methacrylate was increased by the amount of MMA-MM.

Comparative Preparative Example 5 (Preparation of mixture of homopolymers)

As in Preparative Example 5, only FA was used as the monomer to conduct the emulsion polymerization so as to give a fluorohomopolymer and, separately, only methyl methacrylate was used as the monomer to conduct the emulsion polymerization so as to give a methyl methacrylate homopolymer. Both of the resultant homopolymers were mixed in the solid ratio of 50:50 to prepare a treatment liquid having a solid content of 3% by weight.

Comparative Preparative Example 6 (Preparation by emulsion polymerization of random copolymer)

The same polymerization was conducted as in Preparative Example 6 to prepare the random copolymer, except that St-MM was not used and the amount of styrene was increased by the amount of St-MM.

Preparative Example 8 (Preparation by emulsion polymerization of graft copolymer having branch component of polybutyl acrylate)

The same procedure as in Preparative Example 5 was repeated to prepare the graft copolymer, except that 70 g of FA, 25 g of a polybutyl acryylate/methacryloyl group type macromonomer (AB-6, manufactured by Toagosei Chemical Industry Co. Ltd.; number average molecular weight: 6,000; a macromonomer in which the repeating unit is butyl acrylate and the polymerizable end is a methacryloyl group; hereinafter referred to as "BuA-MM"), 5 g of butyl acrylate, 300 g of deionized water, 5 g of polyoxyethyleneoctylphenylether, 5 g of stearyltrimethylammonium chloride and 0.1 g of n-lauryl mercaptan were used as the raw materials.

Comparative Preparative Example 7 (Preparation by emulsion polymerization of random copolymer)

The same polymerization was conducted as in Preparative Example 8 to prepare the random copolymer, except that BuA-MM was not used and the amount of butyl acrylate was increased by the same amount of BuA-MM.

Examples 1 and 2 and Comparative Examples 1 and 2

The copolymer prepared in each of Preparative Examples 1 and 2 and Comparative Preparative Examples 1 and 2 was diluted with n-decane to prepare a resinous liquid having a solid content of 0.5% by weight. A mixed broad fabric of polyester and cotton (65% of polyester and 35% of cotton) was immersed in the resinous liquid, squeezed with a mangle, dried in air and dried at 100° C. for 3 minutes. The water- and oil-repellency, the dry cleaning SR property and the softness of the treated fabric and the low-temperature stability of the product were tested (Table 1 ).

Examples 3 and 4

The graft copolymer prepared in each of Preparative Examples 3 and 4 was diluted with water to prepare a resinous liquid having a solid content of 0.5% by weight. A mixed broad fabric of polyester and cotton (65% of polyester and 35% of cotton) was immersed in the resinous liquid, squeezed with a mangle, predried at 80° C. for 3 minutes and thermally treated at 150° C. for 3 minutes. The water- and oil-repellency, the dry cleaning SR property and the softness of the treated fabric were tested (Table 1 ).

Example 5 and Comparative Example 3

The copolymer prepared in each of Preparative Example 1 and Comparative Preparative Example 3 was diluted with acetone to prepare a treatment liquid having a solid content of 1% by weight. A nylon loop piled carpet cloth (not backing-treated) was immersed in the treatment liquid, squeezed, dried in air and dried at 130° C. for 3 minutes. The water- and oil-repellency and the dry soil stainproof property of the treated carpet were tested (Table 2).

Examples 6–9 and Comparative Examples 4–7

The copolymer prepared in each of Preparative Examples 5, 6, 7 and 8 and Comparative Preparative Examples 4, 6 and 7 was diluted with water to prepare a treatment liquid having a solid content of 3% by weight. The treatment liquid was sprayed on a nylon loop piled carpet cloth (not backing-treated) at a coating amount of 100 g/m$^2$ and the carpet was thermally treated at 130° C. for 5 minutes. The water- and oil-repellency and the dry soil stainproof property of the treated carpet were tested (Table 2).

A treatment liquid containing the mixture of homopolymers prepared in Comparative Preparative Example 5 was used to treat the carpet and the test was conducted.

EVALUATIONS OF PROPERTIES

1. Water repellency

The test was conducted as follows:

(1) Method A

The water repellency is expressed by the water repellency No. determined by the spray method according to JIS-L-1092.

| Water repellency No. | State |
|---|---|
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

(2) Method B

Droplets of an isopropyl alcohol/water mixture having the following composition are positioned on the carpet cloth. The maximum content of isopropyl alcohol in the liquid keeping the shape of the droplet after 3 minutes is expressed as the water repellency.

| Composition of mixture (% by volume) | |
|---|---|
| Isopropyl alcohol | Water |
| 50 | 50 |
| 40 | 60 |
| 30 | 70 |
| 20 | 80 |
| 10 | 90 |
| 0 | 100 |

2. Oil repellency

The oil repellency is determined by, according to AATCC-TM-118-1966, dropping several drops (diameter: about 4 mm) of the following test solution on two positions of a surface of a test cloth, observing the penetration state of the drops after 30 seconds, and the maximum value of oil repellency of the test solution having no penetration is expressed as the oil repellency.

| Oil repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |
| 1 | Nujol | 31.2 |
| 0 | Inferior to 1 | — |

The wash resistance is determined by conducting three times of a washing step of washing the fabric for 15 minutes, rinsing the fabric for 10 minutes and drying the fabric under the use of a washing liquid consisting of 40 g of a detergent (tradename: Zab) and 20 L of water and a temperature of 40° C. in a household electrical washing machine, and then measuring the water repellency and the oil repellency.

3. Stainproof property (1) Dry cleaning SR test

The test for determining the soil release property at dry cleaning (dry cleaning SR property) is conducted as follows. A test cloth is spread on a piece of blotting paper horizontally spread and then five drops of a dirty motor oil (SAE20W40, drained after the feed into an engine of a compact car and the running for 4,000 km) are dropped on the test cloth. A polyethylene sheet is positioned on the test km) are dropped on the test cloth. A polyethylene sheet is positioned on the test cloth and a weight of 2 kg in weight is positioned on the polyethylene sheet. After 60 seconds, the weight and the polyethylene sheet are removed. An excess oil is wiped off and the test cloth is kept standing at a room temperature for 24 hours. The test cloth and a ballast cloth together having a total weight of 450 g are charged into a dry cleaning tester, the dry cleaning is conducted at a room temperature for 5 minutes using 3.78 L of perchloroethylene, and the test cloth is air-dried. The state of the remaining stain of the dried test cloth is compared with a standard photograph plate so that the state of the remaining stain is expressed by the corresponding determined grade shown below. The standard photograph plate is one according to AATCC Test Method 130-1970.

| Determined grade | Criteria |
|---|---|
| 1.0 | Stain remarkably remains |
| 2.0 | Stain considerably remains |
| 3.0 | Stain slightly remains |
| 4.0 | Stain is not noticeable |
| 5.0 | Stain does not remain |

(2) Dry soil stainproof property

Firstly, according to JIS L 1023-1992, a carpet is contaminated with a dry soil having the following composition.

| Components | | Weight ratio % |
|---|---|---|
| Peat moss | | 40 |
| Portland cement | (JIS R 5210) | 17 |
| Kaolin clay | (JIS K 8746) | 17 |
| Diatomaceous earth | (JIS K 8330) | 17 |
| Carbon black | (JIS K 5107) | 0.1 |
| Ferric (III) oxide for ferrite | (JIS K 1462) | 0.15 |
| Nujol | | 8.75 |

After a residual soil on the sample is removed by the use of an electrical vacuum cleaner, the brightness of the sample surface is measured by a colorimeter and a contamination ratio is calculated according the following equation to evaluate the stainproof property against dry soil.

Contamination ratio (%) = $[(L_0 - L)/L_0] \times 100$ wherein $L_0$ is the brightness of the sample before the contamination, and L is the brightness of the sample after the contamination.

4. Softness

The sensual evaluation is made by technical panelists.

5. Stability at low temperature

The copolymer prepared in each of Preparative Examples 1 and 2 and Comparative Preparative Examples 1 and 2 is diluted with n-decane to prepare a resinous liquid having a solid content of 5% by weight. After the resinous liquid is kept in a constant temperature bath at −5° C. for one day, the coagulation state is visually evaluated. No coagulation is expressed by O, and the coagulation is expressed by X.

The test results conducted for the polyester/cotton mixed broad fabric (Examples 1 to 4 and Comparative Examples 1 and 2) are shown in Table 1.

TABLE 1

| | Polymer | Type of polymer | Polymerization Method | Branch of graft copolymer | Water-repellency*1/ Oil-repellency | | Dry cleaning | | Stability at low temperature |
|---|---|---|---|---|---|---|---|---|---|
| | | | | | Initial | Washing three times | SR property | Soft-ness | |
| Ex. 1 | Preparative Example 1 | Graft | Solution polymerization | Methyl methacrylate | 100+/6 | 80/3 | 4 | Hard | ○ |
| Ex. 2 | Preparative Example 2 | Graft | Solution Polymerization | Stearyl methacrylate | 100+/6 | 80+/3 | 5 | Soft | ○ |
| Ex. 3 | Preparative Example 3 | Graft | Emulsion polymerization | Methyl methacrylate | 100+/6 | 80/3 | 4 | Hard | — |
| Ex. 4 | Preparative Example 4 | Graft | Emulsion polymerization | Stearyl methacrylate | 100+/6 | 80+/3 | 5 | Soft | — |
| Com. Ex. 1 | Comparative Preparative Example 1 | Random | Solution polymerization | — | 90/4 | 50/1 | 1 | Somewhat soft | X |
| Com. Ex. 2 | Comparative Preparative Example 2 | Graft | Solution polymerization | FA | 80/4 | 50/1 | 1 | Hard | X |

Note)
*1Evaluated according to Method A
*2"+" represents that the property is slightly better than the shown numeral value.

As clear from the results of Table 1, the graft copolymer having backbone of fluoromonomer used in the present invention gives better water- and oil-repellency, washing resistance and dry cleaning SR property than the graft copolymer having branch of fluoromonomer or the random copolymer having the same monomer composition. In addition, the stability at low temperature is improved.

The results for carpet (Examples 5 to 9 and Comparative Examples 3 to 7) are shown in Table 2.

TABLE 2

| | Polymer | Type of polymer | Polymerization Method | Repeating unit derived from fluorine-free monomer | Water repellency *1 | Oil repellency | Dry soil stainproof property (Contamination ratio) |
|---|---|---|---|---|---|---|---|
| Ex. 5 | Preparative Example 1 | Graft | Solution polymerization | Methyl methacrylate | 50 | 6 | 20 |
| Com. Ex. 3 | Comparative Preparative Example 3 | Random | Solution polymerization | Methyl methacrylate | 40 | 2 | 28 |
| Ex. 6 | Preparative Example 5 | Graft | Emulsion polymerization | Methyl methacrylate | 30 | 4 | 26 |
| Ex. 7 | Preparative Example 6 | Graft | Emulsion polymerization | Styrene | 30 | 4 | 28 |
| Ex. 8 | Preparative Example 7 | Graft | Emulsion polymerization | Methyl methacrylate | 40 | 5 | 22 |
| Com. Ex. 4 | Comparative Preparative Example 4 | Random | Emulsion polymerization | Methyl methacrylate | 20 | 2 | 35 |
| Com. Ex. 5 | Comparative Preparative Example 5 | Mixture of homopolymers | Emulsion polymerization | Methyl methacrylate | 10 | 1 | 28 |
| Com. Ex. 6 | Comparative Preparative Example 6 | Random | Emulsion polymerization | Styrene | 20 | 2 | 38 |
| Ex. 9 | Preparative Example 8 | Graft | Emulsion polymerization | Butyl acrylate | 40 | 5 | 32 |
| Com. Ex. 7 | Comparative Preparative Example 7 | Random | Emulsion polymerization | Butyl acrylate | 20 | 3 | 40 |

Note)
*1: Evaluated according to Method B

As clear from the results of Table 2, the graft copolymer used in the present invention gives better water- and oil-repellency and stainproof property than the random copolymer and the mixture of homopolymers having the same monomer composition.

EFFECT OF THE INVENTION

As explained above, the graft copolymer prepared according to the method of the present invention has the excellent effects as the water- and oil-repellent and the stainproof agent.

What is claimed is:

1. A textile treatment agent which comprises, as an active component, a graft fluorocopolymer having a backbone of a polymer of a fluoromonomer and a branch of a polymer of a macromonomer, the graft fluorocopolymer being prepared by copolymerizing the fluoromonomer with the macromonomer which is a fluorine-free macromonomer having addition-polymerizable unsaturated group copolymerizable with the fluoromonomer, wherein the fluorine-free macromonomer is of the formula:

$$Z-D+CH_2-\underset{A}{\overset{X}{C}}\Big)_{\overline{n}}H \qquad (I)$$

wherein X is a hydrogen atom or methyl group,

A is COOR (wherein R is linear or branched alkyl group having 1 to 22 carbon atoms), CN or a phenyl group, n is from 10 to 500, Z is a (meth)acryloyl group, a styryl group, an allyl group, or a vinyl ester group, and D is $$-S-CH_2COOCH_2CHCH_2OCO- \atop |\atop OH$$

$$-S-CH_2CH_2OCONH\!\!-\!\!\bigcirc$$

$$-COOCH_2CH_2OCONH\!\!-\!\!\bigcirc\!\!-\!\!CH_3$$

$$-S-CH_2CH_2OCO-,$$

or $$-CH_2CH_2OCO-.$$

2. The textile treatment agent according to claim 1, wherein the fluorine-free macromonomer has a glass transition temperature or melting point of at least 35° C.

3. The textile treatment agent according to claim 1, having an average molecular weight of from 5,000 to 1,000,000.

4. The textile treatment agent according to claim 1, having an average molecular weight of from 10,000 to 20,000.

5. The textile treatment agent according to claim 1, wherein the fluoromonomer is selected from the group consisting of:

$CF_3(CF_2)_7(CH_2)OCOCH=CH_2$, $CF_3(CF_2)_6(CH_2)OCOC(CH_3)=CH_2$, $(CF_3)_2CF(CF_2)_6(CH_2)_2OCOCH=CH_2$, $CF_3(CF_2)_7(CH_2)_2OCOC(CH_3)=CH_2$, $CF_3(CF_2)_7(CH_2)_2OCOCH=CH_2$, $CF_3(CF_2)_7SO_2N(CH_3)(CH_2)_2OCOCH=CH_2$, $CF_3(CF_2)_7SO_2N(C_2H_5)(CH_2)_2OCOC(CH_3)=CH_2$, $(CF_3)_2CF(CF_2)_6CH_2CH(OCOCH_3)CH_2OCOC(CH_3)=CH_2$, $(CF_3)_2CF(CF_2)_8CH_2CH(OH)CH_2OCOCH=CH_2$, $CF_3C_6F_{10}(CF_2)_2SO_2N(CH_3)(CH_2)_2OCOCCH=CH_2$, $C_8F_{17}-O-\!\!\bigcirc\!\!-CH_2O-COCH=CH_2,$ $C_5F_{11}-O-\!\!\bigcirc\!\!-CH_2O-COC(CH_3)=CH_2,$ and $C_9F_{17}-O-\!\!\bigcirc\!\!-COOCH_2\underset{|\atop OH}{C}HCH_2OCOC(CH_3)=CH_2.$ 6. The textile treatment agent according to claim 1, wherein the fluorine-free macromonomer has the following repeating unit:

$$H-\!\!\left[\begin{array}{c}CH_3\\|\\C-CH_2\\|\\COOC_nH_{2n+1}\end{array}\right]_m\!\!-S-CH_2COOCH_2\underset{|\atop OH}{C}HCH_2OCOC(CH_3)=CH_2$$

wherein m is 10 to 500 and n is 1 to 22.

7. The textile treatment agent according to claim 1, wherein the fluorine-free macromonomer has the following repeating unit:

$$H-\!\!\left[\begin{array}{c}CH_3\\|\\C-CH_2\\|\\COOCH_3\end{array}\right]_m\!\!-S-CH_2COOCH_2\underset{|\atop OH}{C}HCH_2OCOC(CH_3)=CH_2$$

wherein m is 10 to 500.

8. The textile treatment agent according to claim 1, wherein the fluorine-free macromonomer has the following repeating unit:

$$H-\!\!\left[\begin{array}{c}CH_3\\|\\C-CH_2\\|\\COOC_{18}H_{37}\end{array}\right]_m\!\!-S-CH_2COOCH_2\underset{|\atop OH}{C}HCH_2OCOC(CH_3)=CH_2$$

wherein m is 10 to 500.

9. The textile treatment agent according to claim 1, wherein the flourine-free macromonomer has the following repeating unit:

$$H-\!\!\left[\begin{array}{c}H\\|\\C-CH_2\\|\\COOC_4H_9\end{array}\right]_m\!\!-S-CH_2COOCH_2\underset{|\atop OH}{C}HCH_2OCOC(CH_3)=CH_2$$

wherein m is 10 to 500.

10. The textile treatment agent according to claim 1, wherein the fluorine-free macromonomer has the following repeating unit:

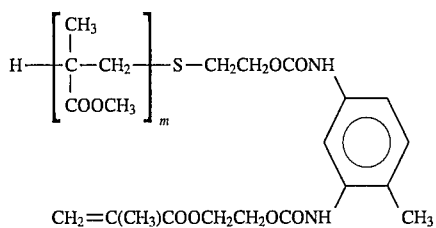

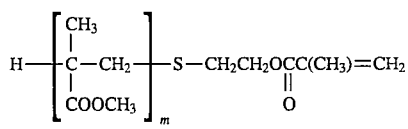

wherein m is 10 to 500.

11. The textile treatment agent according to claim 1, wherein the fluorine-free macromonomer has the following repeating unit:

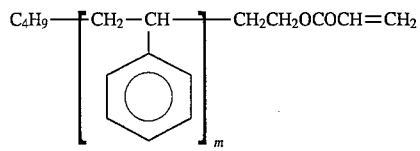

wherein m is 10 to 500.

12. The textile treatment agent according to claim 1, wherein the fluorine-free macromonomer has the following repeating unit:

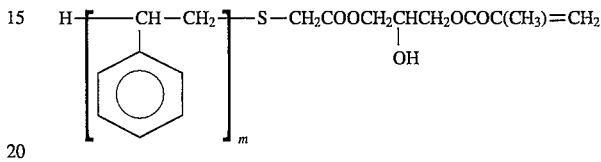

wherein m is 10 to 500.

13. The textile treatment agent according to claim 1, wherein the fluorine-free macromonomer has the following repeating unit:

H—[—CH—CH$_2$—]$_m$—S—CH$_2$COOCH$_2$CHCH$_2$OCOC(CH$_3$)=CH$_2$
       |                                              |
      (C$_6$H$_5$)                                    OH wherein m is 10 to 500.

* * * * *